(12) United States Patent
Dai et al.

(10) Patent No.: US 9,310,594 B2
(45) Date of Patent: Apr. 12, 2016

(54) OPTICAL LENS AND LIGHT SOURCE MODULE HAVING THE SAME

(71) Applicant: HON HAI PRECISION INDUSTRY CO., LTD., New Taipei (TW)

(72) Inventors: Feng-Yuen Dai, New Taipei (TW); Chau-Jin Hu, New Taipei (TW); Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 224 days.

(21) Appl. No.: 14/069,371

(22) Filed: Oct. 31, 2013

(65) Prior Publication Data
US 2015/0117029 A1  Apr. 30, 2015

(30) Foreign Application Priority Data
Oct. 30, 2013  (TW) .............................. 102139202 A

(51) Int. Cl.
*F21V 5/04* (2006.01)
*G02B 19/00* (2006.01)

(52) U.S. Cl.
CPC .............. *G02B 19/0061* (2013.01); *F21V 5/04* (2013.01); *F21V 5/048* (2013.01); *G02B 19/0014* (2013.01)

(58) Field of Classification Search
CPC ............. F21V 5/00; F21V 5/04; F21V 5/046; F21V 5/045; F21V 5/048; G02B 3/00; G02B 3/02; G02B 3/04; G02B 3/08; G02B 19/0061; G02B 19/0014
See application file for complete search history.

(56) References Cited

U.S. PATENT DOCUMENTS

| | | | |
|---|---|---|---|
| 7,798,679 B2 * | 9/2010 | Kokubo ............. | G02B 19/0061 362/334 |
| 8,926,142 B2 * | 1/2015 | Chen .......................... | F21V 5/04 362/311.02 |
| 8,967,833 B2 * | 3/2015 | Wang ........................ | F21V 5/04 359/708 |
| 8,979,326 B2 * | 3/2015 | Hu ............................. | F21V 5/04 362/308 |
| 9,065,026 B2 * | 6/2015 | Chinniah ............... | F21V 29/713 |
| 2010/0165640 A1 * | 7/2010 | Lin ............................ | F21V 5/04 362/336 |
| 2013/0094218 A1 * | 4/2013 | Wang ........................ | F21V 5/04 362/311.02 |
| 2013/0155690 A1 * | 6/2013 | Chen ......................... | F21V 5/04 362/311.02 |
| 2014/0126222 A1 * | 5/2014 | Wang ...................... | F21V 5/046 362/311.09 |

* cited by examiner

*Primary Examiner* — Bao Q Truong
(74) *Attorney, Agent, or Firm* — Novak Druce Connolly Bove + Quigg LLP

(57) ABSTRACT

A light source module includes a light source and an optical lens facing the light source. The optical lens includes a light incident face facing the light source, a light emitting face opposite to the light incident face, and a connecting face connecting the light incident face and the light emitting face. The connecting face is planar. The light emitting face includes a lateral face extending upwardly from an outer periphery of the connecting face and a top face located above the light incident face. The top face of the light emitting face comprises a center curved facet and a periphery curved facet surrounding and extending outwardly from the center curved facet. The light incident face is a discontinuous face and includes a plurality of curved facets.

18 Claims, 5 Drawing Sheets

OPTICAL LENS AND LIGHT SOURCE MODULE HAVING THE SAME

BACKGROUND

1. Technical Field

The disclosure generally relates to optical lenses, and particularly relates to an optical lens to increase an illuminating angle of a light source and a light source module having the optical lens.

2. Description of Related Art

In recent years, due to excellent light quality and high luminous efficiency, light emitting diodes (LEDs) have increasingly been used as substitutes for incandescent bulbs, compact fluorescent lamps and fluorescent tubes as light sources of illumination devices.

Generally, light intensity of a light emitting diode gradually decreases from a middle portion to lateral sides thereof. Such a feature makes the LED unsuitable for functioning as a light source which needs a wide illumination, for example, a light source for a direct-type backlight module for a liquid crystal display (LCD). In some conditions, it is required to have an optical lens which can help the light emitted from a light emitting diode to have a wider illuminating angle and a special light distribution. Unfortunately, the conventional optical lens and a light source module having the conventional optical lens can not obtain a satisfactory effectiveness.

What is needed, therefore, is an improved optical lens and a light source module having the optical lens to overcome the above described disadvantages.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments of an optical lens and a light source module will now be described in detail below and with reference to the drawings.

Figure 1:
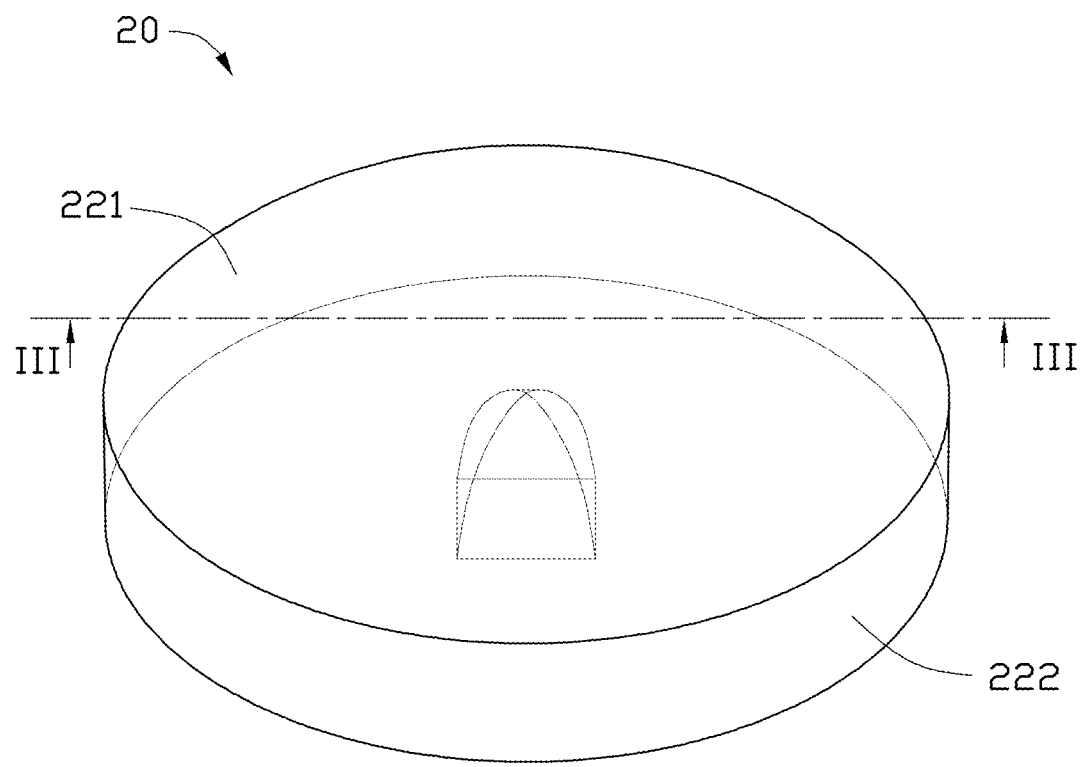
FIG. 1 is an isometric view of an optical lens in accordance with an exemplary embodiment of the present disclosure.
Figure 2:
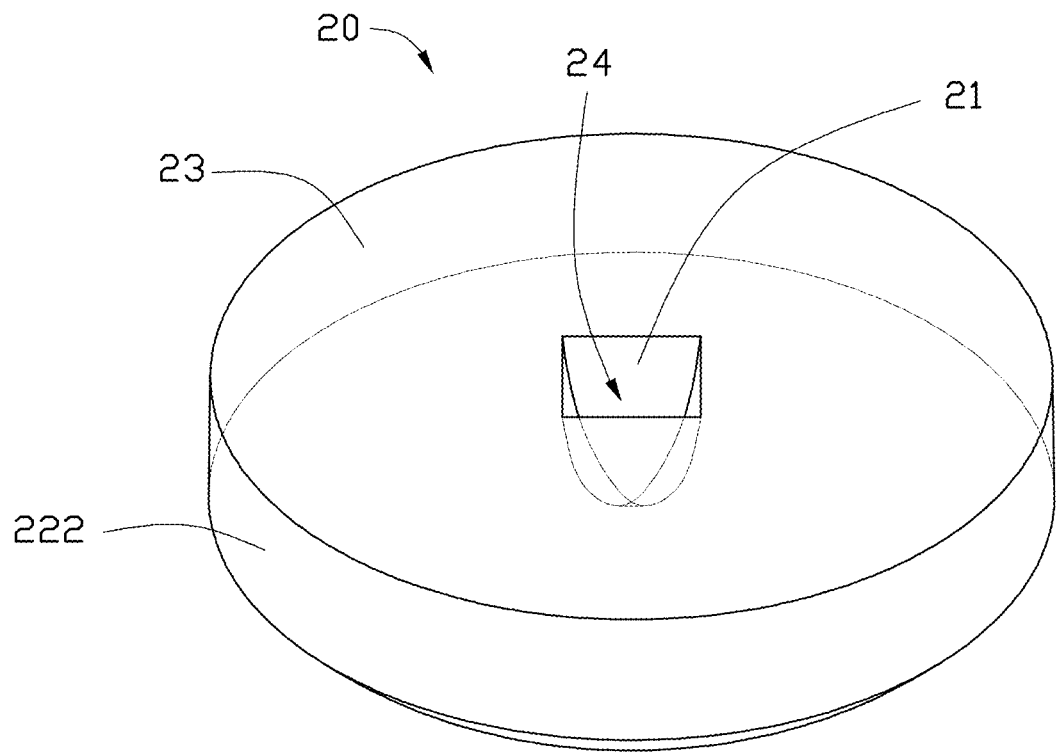
FIG. 2 is an inverted view of the optical lens in FIG. 1.
Figure 3:
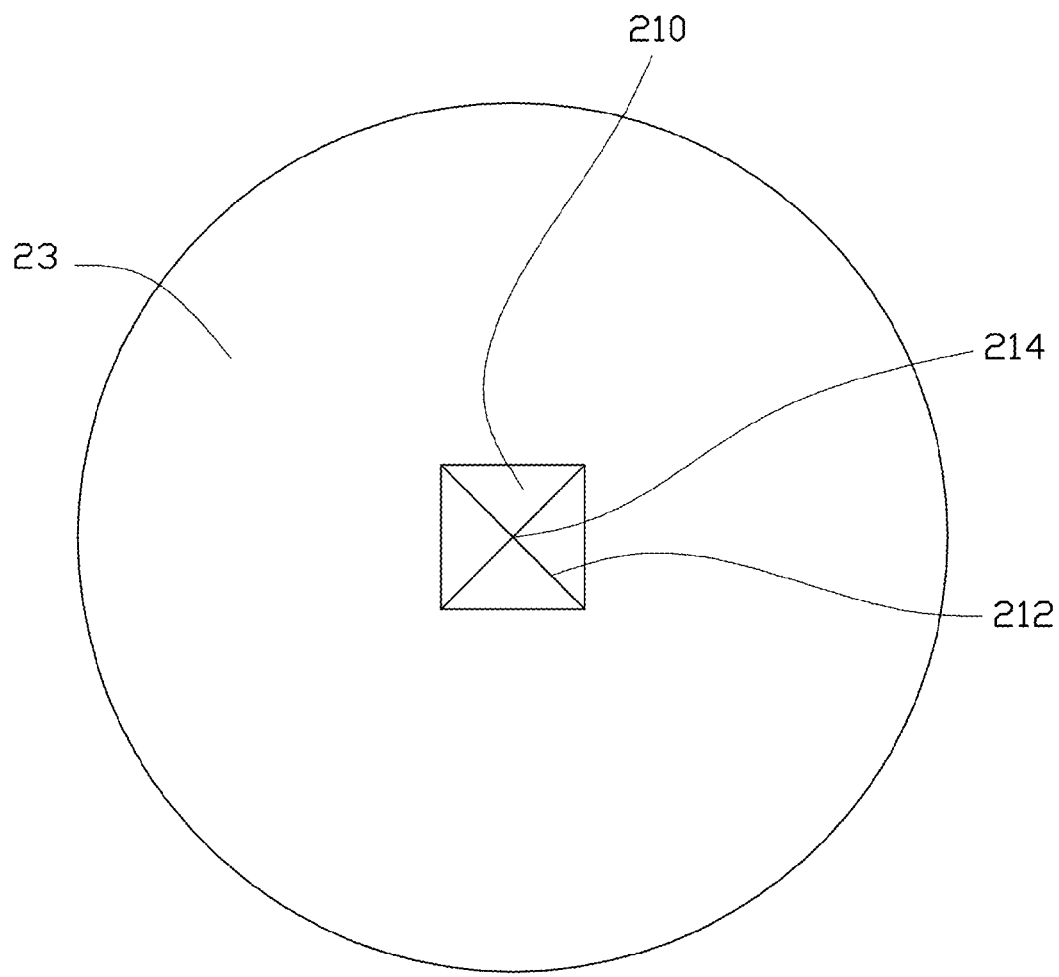
FIG. 3 is a bottom view of the optical lens in FIG. 1.
Figure 4:
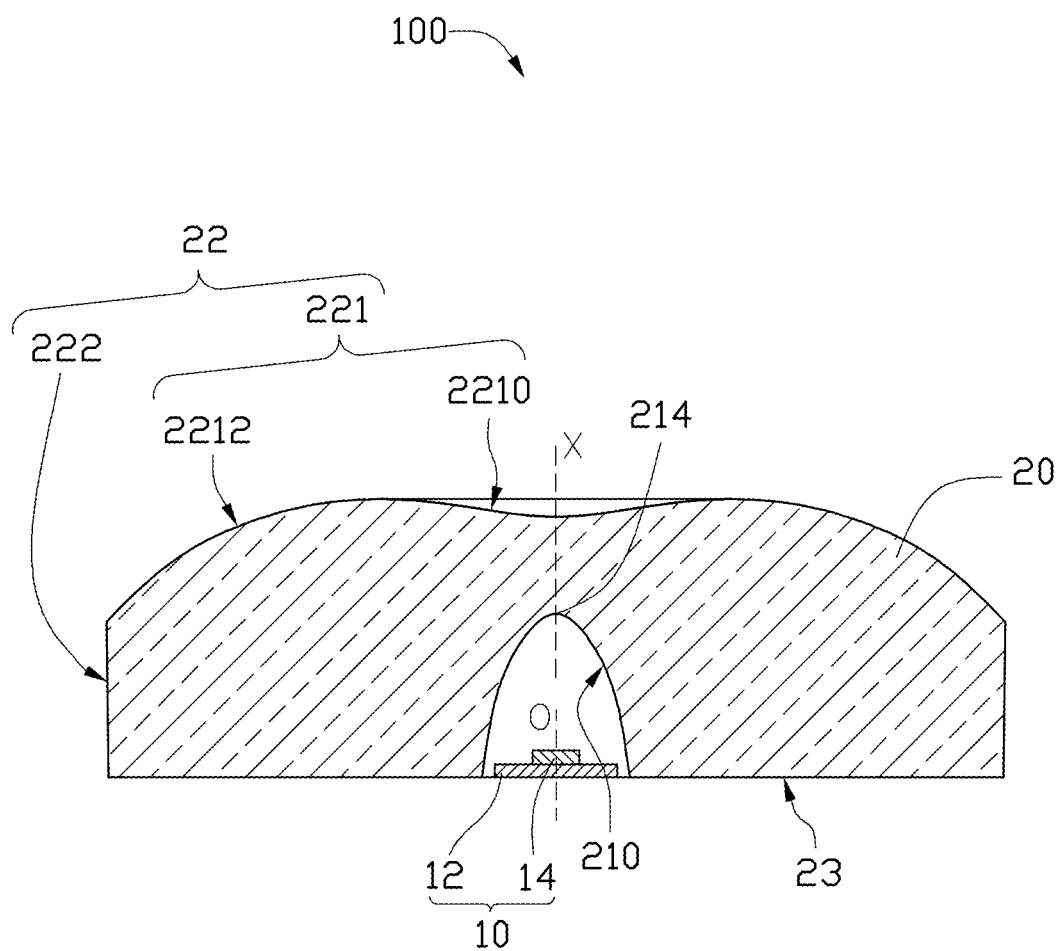
FIG. 4 is a cross section view of the light source module in FIG. 1, taken along a line IV-IV thereof, wherein a light source is positioned in the optical lens.

Referring to FIGS. 1 through 4, a light source module 100 in accordance with an exemplary embodiment of the disclosure is illustrated. The light source module 100 includes a light source 10 and an optical lens 20 covering the light source 10.

The optical lens 20 includes a light incident face 21 facing the light source 10, a light emitting face 22 opposite to the light incident face 21, and a connecting face 23 connecting the light incident face 21 and the light emitting face 22. The light source 10 has an optical axis O, around which light emitted from the light source 10 concentrates in a surrounding space.

In this embodiment of the present disclosure, the light source 10 is a light emitting diode (LED), and includes a supporting base 12 and an LED chip 14 mounted on the supporting base 12. The supporting base 12 is flat. The supporting base 12 may be made of electrically-insulating materials such as epoxy, silicon or ceramic. The LED chip 14 may be made of semiconductor materials such as GaN, InGaN, AlInGaN or the like. Preferably, the LED chip 14 emits visible light when being activated.

The optical lens 20 is integrally made of transparent materials such as PC (polycarbonate), PMMA (polymethyl methacrylate) or optical glass. It could be understood, a plurality of fluorescence, such as YAG, TAG, silicate, nitride, nitrogen oxides, phosphide, arsenide, telluride or sulfide, could be further provided to mix in the optical lens 20.

The optical lens 20 is located above and spaced from the light source 10. A center of a bottom face of the optical lens 20 is recessed inwardly, whereby the light incident face 21 and a receiving space 24 for accommodating the light source 10 are formed. The lateral face 222 is a cylindrical face. The connecting face 23 is an annular and planar face surrounding the light incident face 21. In use, the connecting face 23 is fitly attached on a supporting face (not shown) supporting the light source 10 and the optical lens 20. The optical lens 20 defines a central axis X, and the optical lens 20 is rotationally symmetrical relative to the central axis X. The central axis X of the optical lens 20 is aligned with the optical axis O of the light source 10. The light emitting face 22 is rotationally symmetrical relative to the central axis X.

The light incident face 21 is a discontinuous face and includes a plurality of curved facets 210. In the embodiment of the present disclosure, there are four curved facets 210. Each curved facet 210 is bent inwardly and upwardly towards the central axis X. A width of each curved facet 210 gradually decreases along a bottom-to-top direction of the optical lens 20. A curvature of each curved facet 210 gradually increases along the bottom-to-top direction of the optical lens 20. Every two adjacent curved facets 210 intersect at a boundary line 212. In the embodiment of the present disclosure, there are four boundary lines 212. Each boundary line 212 is curved. The boundary lines 212 intersect at a joint 214. The joint 214 is positioned at the central axis X. The light incident face 21 is axisymmetric relative to the central axis X. In the embodiment of the present disclosure, a projection of the light incident face 21 on a horizontal plane is a square, an integral projection of the boundary lines 212 on the horizontal plane is two diagonals of the square, and a projection of each curved facet 210 on the horizontal plane is a triangle.

The light emitting face 22 includes a lateral face 222 extending upwardly from an outer periphery of the connecting face 23 and a top face 221 located above the light incident face 21. The top face 221 of the light emitting face 22 includes a center curved facet 2210 and a periphery curved facet 2212 surrounding and extending outwardly from the center curved facet 2210. A center of the top face 221 is recessed inwardly, whereby the center curved facet 2210 is formed. The center curved facet 2210 is sculptured, ellipsoidal, spherical or paraboloidal. The center curved facet 2210 is rotationally symmetrical relative to the central axis X. The center curved facet 2210 protrudes toward the light incident face 21. The periphery curved facet 2212 protrudes away from the light incident face 21. The periphery curved facet 2212 is sculptured, ellipsoidal, spherical or paraboloidal. The periphery curved facet 2212 is rotationally symmetrical relative to the central axis X. An outer periphery of the periphery curved facet 2212 of the light emitting face 22 correspondingly meets the lateral face 222.

Figure 5:
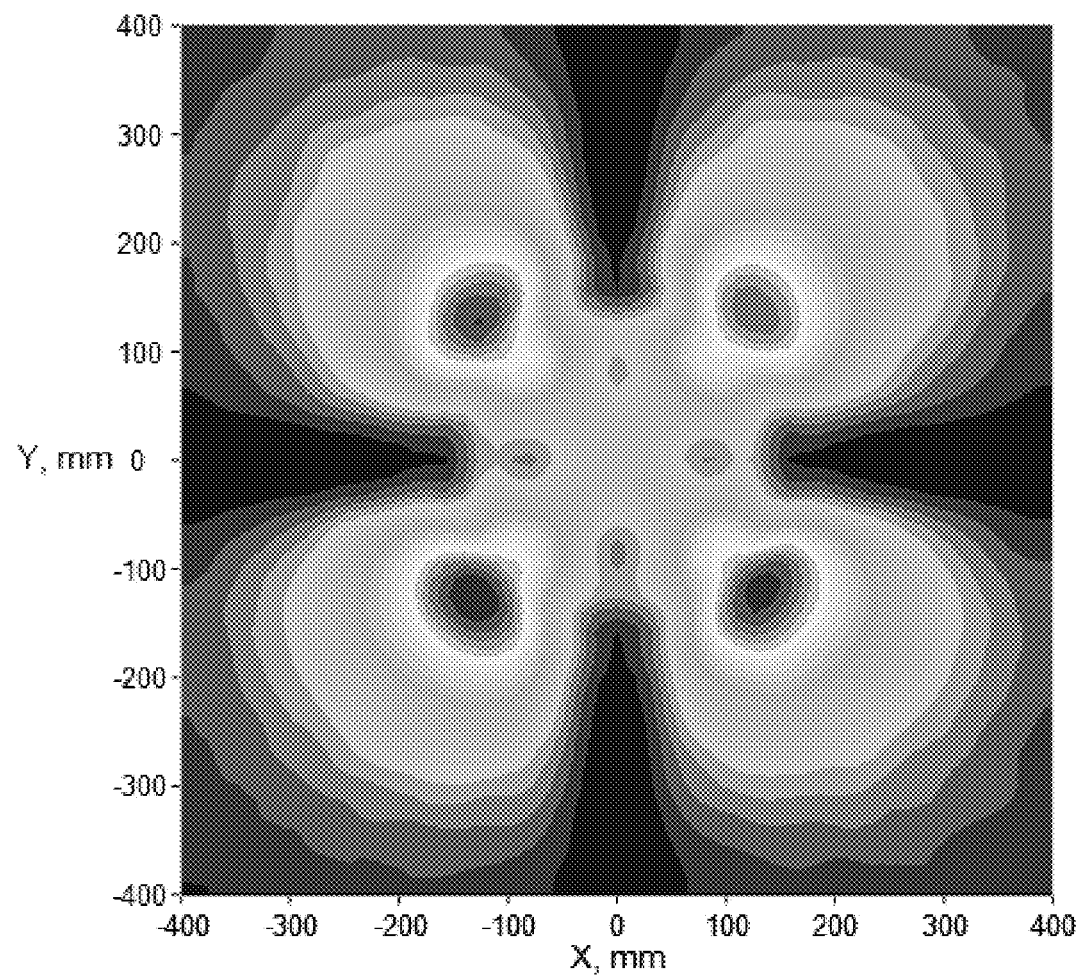
FIG. 5 shows a light distribution of a light source module having the optical lens of FIG. 1.

Referring to FIGS. 1 through 5, in use, the light emitted from the light source 10 is entered into the optical lens 20 through the curved facets 210 of the light incident face 21 and refracted, then transmitted in the optical lens 20, and exited and refracted from the center curved facet 2210 and the periphery curved facet 2212 of the top face 221, and the lateral face 222, such that an illumination angle of the light source module 100 is widened and a light distribution of the light source module 100 having a shape like a butterfly is obtained.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical lens for adjusting light emitted from a light source, comprising:
    a light incident face facing the light source;
    a light emitting face opposite to the light incident face; and
    a connecting face connecting the light incident face and the light emitting face;
    wherein the connecting face is planar, and the light emitting face comprises a lateral face extending upwardly from an outer periphery of the connecting face and a top face located above the light incident face;
    wherein the top face of the light emitting face comprises a center curved facet and a periphery curved facet surrounding and extending outwardly from the center curved facet;
    wherein the light incident face is a discontinuous face and includes a plurality of curved facets; and
    wherein a width of each curved facet gradually decreases along a bottom-to-top direction of the optical lens.

2. The optical lens as claimed in claim 1, wherein a curvature of each curved facet gradually increases along the bottom-to-top direction of the optical lens.

3. The optical lens as claimed in claim 1, wherein every two adjacent curved facets intersect at a boundary line, and each boundary line is curved.

4. The optical lens as claimed in claim 3, wherein there are four curved facets and four boundary lines, the boundary lines intersect at a joint.

5. The optical lens as claimed in claim 4, wherein a projection of the light incident face on a horizontal plane is a square, an integral projection of the boundary lines on the horizontal plane is two diagonals of the square, and a projection of each curved facet on the horizontal plane is a triangle.

6. The optical lens as claimed in claim 1, wherein the center curved facet protrudes toward the light incident face, and the periphery curved facet protrudes away from the light incident face.

7. The optical lens as claimed in claim 1, wherein the center curved facet is sculptured, ellipsoidal, spherical or paraboloidal, the periphery curved facet is sculptured, ellipsoidal, spherical or paraboloidal.

8. The optical lens as claimed in claim 1, wherein the optical lens defines a central axis, and the optical lens is symmetrical relative to the central axis.

9. The optical lens as claimed in claim 8, wherein the curved facets intersect at a joint, and the joint is positioned at the axis.

10. A light source module, comprising:
    a light source;
    an optical lens covering the light source, and the optical lens comprising:
        a light incident face facing the light source;
        a light emitting face opposite to the light incident face; and
        a connecting face connecting the light incident face and the light emitting face;
        wherein the connecting face is planar, and the light emitting face comprises a lateral face extending upwardly from an outer periphery of the connecting face and a top face located above the light incident face;
        wherein the top face of the light emitting face comprises a center curved facet and a periphery curved facet surrounding and extending outwardly from the center curved facet;
        wherein the light incident face is a discontinuous face and includes a plurality of curved facets; and
        wherein a width of each curved facet gradually decreases along a bottom-to-top direction of the optical lens.

11. The light source module as claimed in claim 10, wherein a curvature of each curved facet gradually increases along the bottom-to-top direction of the optical lens.

12. The light source module as claimed in claim 10, wherein every two adjacent curved facets intersect at a boundary line, and each boundary line is curved.

13. The light source module as claimed in claim 12, wherein there are four curved facets and four boundary lines, the boundary lines intersect at a joint.

14. The light source module as claimed in claim 13, wherein a projection of the light incident face on a horizontal plane is a square, an integral projection of the boundary lines on the horizontal plane is two diagonals of the square, and a projection of each curved facet on the horizontal plane is a triangle.

15. The light source module as claimed in claim 10, wherein the center curved facet protrudes toward the light incident face, and the periphery curved facet protrudes away from the light incident face.

16. The light source module as claimed in claim 10, wherein the center curved facet is sculptured, ellipsoidal, spherical or paraboloidal, the periphery curved facet is sculptured, ellipsoidal, spherical or paraboloidal.

17. The light source module as claimed in claim 10, wherein the optical lens defines a central axis, and the optical lens is symmetrical relative to the central axis.

18. The light source module as claimed in claim 17, wherein the curved facets intersect at a joint, and the joint is positioned at the axis.

* * * * *